United States Patent
Chou et al.

(10) Patent No.: US 8,693,319 B2
(45) Date of Patent: Apr. 8, 2014

(54) SCHEME FOR AVOIDING DEADLOCK IN MULTI-RING INTERCONNECT, WITH ADDITIONAL APPLICATION TO CONGESTION CONTROL

(75) Inventors: Ching-Tsun Chou, Palo Alto, CA (US); Naveen Cherukuri, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 334 days.

(21) Appl. No.: 12/238,194

(22) Filed: Sep. 25, 2008

(65) Prior Publication Data

US 2010/0074106 A1 Mar. 25, 2010

(51) Int. Cl.
*G01R 31/08* (2006.01)
*H04L 12/28* (2006.01)

(52) U.S. Cl.
USPC ........................... 370/229; 370/403; 370/406

(58) Field of Classification Search
USPC .......................................... 370/229, 458–460
See application file for complete search history.

(56) References Cited

U.S. PATENT DOCUMENTS

| | | | | |
|---|---|---|---|---|
| 4,933,935 | A * | 6/1990 | Adams | 370/406 |
| 5,442,750 | A * | 8/1995 | Harriman et al. | 709/233 |
| 6,091,705 | A | 7/2000 | Regula | |
| 6,731,648 | B1 * | 5/2004 | Cotter | 370/458 |
| 6,922,390 | B1 * | 7/2005 | Chapman et al. | 370/229 |
| 2001/0048687 | A1 * | 12/2001 | Coden | 370/403 |
| 2003/0046462 | A1 * | 3/2003 | Wolff et al. | 710/100 |
| 2004/0073933 | A1 * | 4/2004 | Gollnick et al. | 725/81 |
| 2006/0045120 | A1 * | 3/2006 | Mattina et al. | 370/460 |
| 2008/0068984 | A1 * | 3/2008 | Kobayashi et al. | 370/217 |

OTHER PUBLICATIONS

Chinese Office Action with English translation corresponding to Chinese Application No. 200910175174.0, dated Feb. 21, 2012; 4 pages.
State Intellectual Property Office (SIPO) of the P.R. China, Chinese Patent Application No. 200910175174.0, mail date: Dec. 4, 2012, total of 6 pages.

* cited by examiner

*Primary Examiner* — Brandon Renner
(74) *Attorney, Agent, or Firm* — Patent Capital Group

(57) ABSTRACT

A method and system to avoid multi-ring deadlock. The method includes removing a message on a multi-ring interconnect either with a ring connector associated with the target of the message or by the message's source station such that the message travels no more than one time around the slotted ring interconnect before its removal. The method may also be applied to single ring networks for congestion control.

31 Claims, 3 Drawing Sheets

SCHEME FOR AVOIDING DEADLOCK IN MULTI-RING INTERCONNECT, WITH ADDITIONAL APPLICATION TO CONGESTION CONTROL

RELATED APPLICATION

None.

FIELD

Embodiments of the invention are related to multi-ring interconnects and according to one embodiment, a scheme for avoiding deadlock in a multi-ring interconnect. Other embodiments are drawn to congestion control and networks having multi-ring interconnects that avoid deadlocks.

BACKGROUND

A link interconnect allows communication between devices and functional blocks. Some examples of interconnects are shared buses and point to point links. A slotted ring interconnect consists of a fixed number of slots arranged in a closed loop. Each ring slot is either empty, or occupied by a message. The ring may rotate either clockwise or counterclockwise. That is, a message in a slot may travel around the ring in either clockwise or counterclockwise direction. The direction of rotation does not matter. The basic operation of the ring is simple: at each clock, the content of each slot is typically replaced by that of its upstream neighbor (e.g., the counterclockwise neighbor if the ring rotation is clockwise). Essentially, the whole ring can be thought of as a circular shift register.

Typically, a subset of the slots on a ring has one or more stations attached to them. All of the slots on a ring, however, may have one or more stations attached. A station can send and receive messages via the slot to which it is attached. To send a message, a station waits for its attached slot to become empty and, when that happens, puts the message it wishes to send in the slot. Typically, each message carries the identification of the station to which it is destined.

Generally, a station keeps monitoring its attached slot for messages targeting it. When a message arrives, the station removes the message from the slot if it has the necessary resource for receiving it. Whether a station can receive and send in the same clock depends on implementation details and is not relevant to the present invention.

BRIEF DESCRIPTION OF THE DRAWINGS

The invention may best be understood by referring to the following description and accompanying drawings that are used to illustrate embodiments of the invention.

DETAILED DESCRIPTION

One embodiment of the invention is drawn to networks having multiple slotted rings. Another embodiment of the invention is drawn to a method of addressing the problem of inter-ring deadlock in such networks. A further embodiment of the invention is drawn to congestion control, even in a single ring.

In the following description, certain terminology is used to describe features of the invention. For example, the term "device" or "agent" is general and may be used to describe any electrical component coupled to a link. A "link or interconnect" is generally defined as an information-carrying medium that establishes a communication pathway for messages, namely information placed in a predetermined format. The link or interconnect may be a wired physical medium (e.g., a bus, one or more electrical wires, trace, cable, etc.) or a wireless medium (e.g., air in combination with wireless signaling technology).

The term "network" may refer to any interconnected group or system. That is, a network may include devices linked in the same machine or devices in different computers linked to share information. Networks include, but are not limited to, local area network (LAN), wide area network (WAN), wireless local area network (WLAN), and virtual area network (VLAN).

As discussed above, a subset of the slots on a ring typically has one or more stations attached to them. A station is broadly defined as any device that can send and receive messages. Stations typically send and receive messages via the slot to which they are attached. To send a message, a station waits for its attached slot to become empty. When the attached slot is empty, the station puts the message it wishes to send in the slot. Typically, each message carries the identification of the station to which it is destined. Generally, a station monitors its attached slot for messages targeting it. When a message targeting the station arrives, the station removes the message from the slot if it has the necessary resource for receiving it.

A slotted ring interconnect is essentially a 1-dimensional communication medium with a limited cross-section bandwidth. When the number of stations which wish to communicate with each other is large, it is desirable to divide the stations among multiple slotted ring interconnects to increase the aggregate communication bandwidth. The multiple slotted ring interconnects can be connected together in various topologies, some of which are illustrated in FIGS. 1a-1c.

Figure 1A:
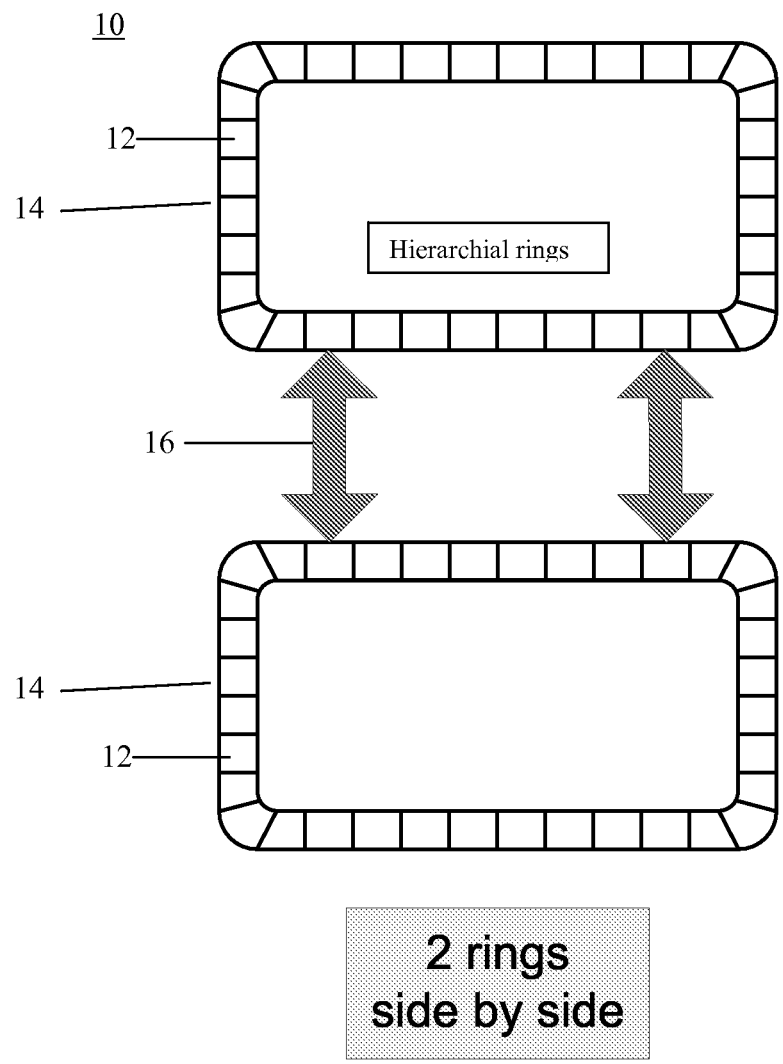
FIG. 1a is schematic illustration of an interconnection topology having two side by side rings.

FIG. 1a illustrates an interconnection topology 10 having two slotted ring interconnects 14 in a side by side topology. As illustrated, each of the slotted ring interconnects 14 has 36 slots 12. The number of illustrated slots 12 is arbitrary, however, and not limited to 36. That is, the slotted ring interconnects 14 may more or less slots 12. Furthermore, it is not necessary that the various slotted ring interconnects 14 have the same number of slots 12. Indeed, in some embodiments, the various slotted ring interconnects 14 in a topology have different numbers of slots 12.

Figure 1B:
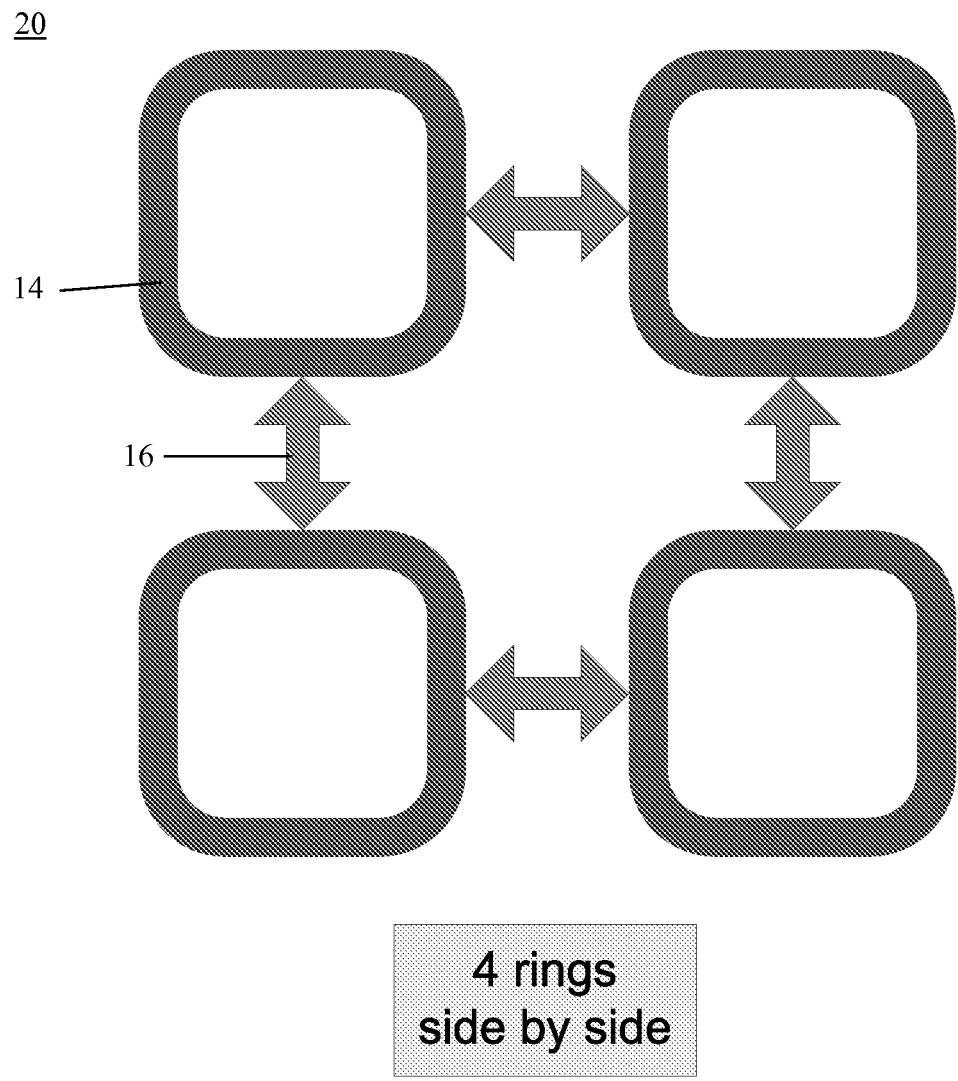
FIG. 1b is schematic illustration of an interconnection topology having four side by side rings.
Figure 1C:
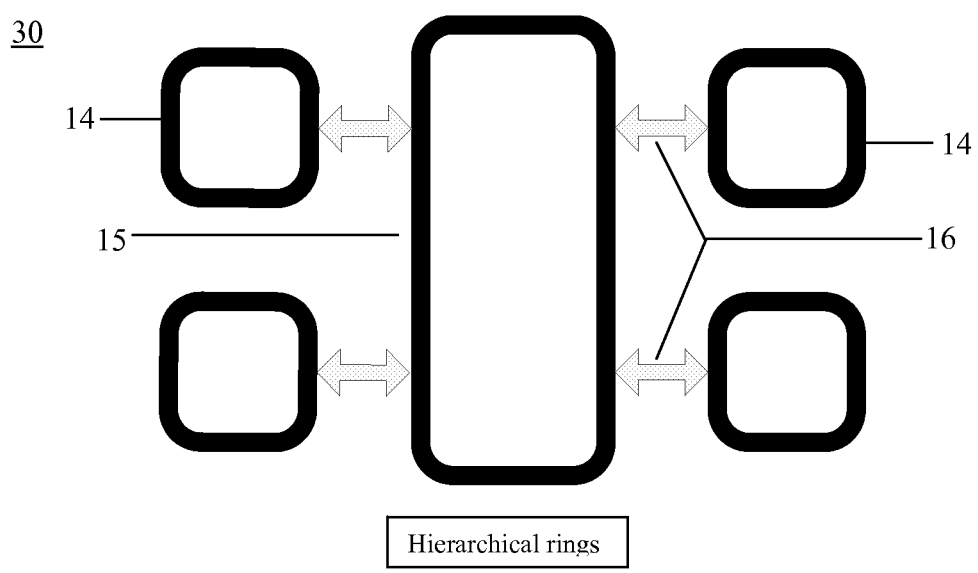
FIG. 1c is schematic illustration of an interconnection topology having hierarchical rings.

The double arrows in FIG. 1a-1c represent ring connectors 16 which move messages between the slotted ring interconnects 14. The ring connectors 16 are typically bridges but may be any device, such as repeaters, routers, hubs, or switches, which can connect multiple slotted rings 14.

FIG. 1b illustrates an interconnection topology 20 having four slotted ring interconnects 14 in a side by side topology while FIG. 1c illustrates an interconnection topology 30 having five slotted ring interconnects 14 in a hierarchical topology. The slots 12 are not shown in FIGS. 1b and 1c. In the illustrated hierarchical topology, messages on the left side of FIG. 1c destined for a station on the right side of topology must pass through the central slotted ring 15. Many other topologies are possible. The topologies illustrated in FIGS. 1a-1c are for illustration only.

Multi-ring Deadlock

The deadlock problem in a system with multi-ring interconnects can be illustrated using the 2-ring topology in FIG. 1a. If the system ever gets into a state in which all slots 12 of the upper (or lower) slotted ring interconnect 14 are occupied by messages targeting stations (not shown) in the lower (upper) ring and all buffers in the ring connector 16 are full, a deadlock ensues because no slot 12 in either slotted ring interconnect 14 can be emptied. There are several points worth noting about this kind of deadlock.

First, the deadlock can still happen even when the ultimate destination (target station) of each message has the resource for receiving it. This is because the ultimate destination (target station) is on one slotted ring interconnect 14 while the message is trapped on the other slotted ring interconnect 14. Second, the precise topology in which the multiple slotted ring interconnects 14 are connected together is not important. One can easily construct similar deadlock scenarios for any of the above topologies 20, 30 and other multi-ring topologies. Third, the numbers and positions of the ring connectors 16 and the precise buffer mechanisms in them are also not important. Once all the slots 12 and ring connector buffers (not shown) are filled, a deadlock ensues. Fourth, the fact that there is more than one slotted ring interconnect 14 in the network is fundamental for the deadlock to occur. In a single ring, every message keeps revisiting its target station as long as it stays on the slotted ring interconnect 14, thus giving the target station infinitely many chances of receiving it. In contrast, with two or more slotted ring interconnects 14, it is possible for each slotted ring interconnect 14 to be filled with messages whose destination stations are on other slotted ring interconnects 14.

Scheme for Avoiding Multi-Ring Deadlock

The basic idea behind the scheme is as follows. Preferably, each message is removed from the ring by either a target on a slotted ring interconnect 14 (which could be a ring connector 16, such as a bridge) or the message's source station on the slotted ring interconnect 14. Thus, the slot 12 that the message occupies becomes available in at most one round. If the target of the message can receive the message, the target removes the message from the slotted ring interconnect 14. Thus, for example, if the ring connector 16 connecting two slotted rings can receive the message, it removes the message from the first slotted ring interconnect 14 and passes it to the second slotted ring interconnect 14. Once a message crosses over to the other slotted ring interconnect 14, the final destination will receive it eventually. Thus, deadlock is not an issue once the message makes its way to the slotted ring interconnect 14 containing final destination. If the target cannot receive the message, the target (or more precisely, the bridge logic connecting the two slotted ring interconnects) marks the message with a negative flag. That is, the intermediate target (e.g. ring connector 16 or bridge) is responsible for setting the flags. The message then circles back to the source station as a negative acknowledgement.

The source station holds on to a copy of the message until it gets either a negative or a positive acknowledgement. As already stated, a negative acknowledgement is a marked message circling back to its source. The source then removes the marked message from the slotted ring interconnect 14 to make its slot 12 available. The source station will make another attempt at sending the message later using the copy it has kept. Since the total number of slots 12 in the ring is fixed and known, the source station can count time and know exactly when a negative acknowledgement, if any, should arrive. If no negative acknowledgment arrives in that clock, the source station considers that as a positive acknowledgement. In the case of a positive acknowledgement, the source station can discard its copy of the message.

EXAMPLE

The following is an example implementation of the above scheme. In this example, each message carries the following bits in addition to its payload: (1) a valid bit V, (2) a negative acknowledgement bit N, and (3) for each station k on the slotted ring interconnect 14, a corresponding destination bit D[k]. In the following, the choice of setting the bits to 0 or 1 is arbitrary. That is, the opposite convention or some other convention could have been selected.

The signaling protocol between a source station s and a target station t (where s and t are different stations and either or both of them may be a bridge connecting this ring with another ring) can be described as follows. First, for a source station s to send a message, it waits for a slot 12 with V=0 and N=0. The message is sent by setting V:=1, D[s]:=1, and D[t]:=1. Second, for a target station t to receive a message, it waits for a slot with V=1 and N=0 and D[t]=1. The message is received by setting V:=0, D[s]:=0, and D[t]:=0. Third, if target station t cannot receive the message, it indicates a negative acknowledgement by setting V:=0, N:=1, and D[t]:=0. Fourth, source station s counts time and performs the following checks in the clock when either positive or negative acknowledgement is scheduled to arrive.

If V=0 and N=1 and D[s]=1, then source station s knows a negative acknowledgement has arrived, which it removes from the slotted interconnect ring 14 by setting N:=0, D[s]:=0. In some embodiments, it may also choose to use the same slot 12 to send a different message if implementation constraints allows this. If, however, either D[s]=0 or (V=1 and N=0), then source station s knows that a positive acknowledgement has arrived. In this scenario there are two subcases to consider. First, if D[s]=0, this is a pure positive acknowledge and source station s need not do anything other than discard the copy of the message that is acknowledged. Second, if D[s]=1 but (V=1 and N=0), this is both a positive acknowledgement to the old message that source station s sent and the arrival of a new message targeting source station s from a station u which may or may not be the same as t. If source station s can receive the new message, source station s receives the message by setting V:=0, D[s]:=0, and D[u]:=0. If source station s cannot receive the new message, then source station s negatively acknowledges the new message by setting V:=0, N:=1, and D[s]:=0.

This protocol has several advantageous features. First, a message always occupies a slot 12 for at most one cycle around the slotted ring interconnect 14. Second, once a message is successfully received by its target, its slot 12 becomes immediately reusable by other messages; only a negative acknowledgement needs to cycle back to the message's source station. Third, each station k typically needs to monitor only bits V, N, and D[k] and does not need to monitor any D[j] with j≠k. Fourth, each station k needs to drive (set the bit to 0 or 1) at most three out of V, N, D[k], and one D[j] with j≠k. Fifth, no additional bits are needed in the payload portion to identify the source and target stations of a message. Optionally, however, a specific implementation may choose to include additional bits to identify the source and target stations if doing so is useful.

Application to Congestion Control on a Single Slotted Ring Interconnect

By limiting the slot 12 occupancy of a message to at most one cycle around the slotted ring interconnect 14, the above scheme can also be applied to congestion control. A station can monitor the occupancy rate of the slots 12 of the slotted ring interconnect 14 as the slots rotate past it and use that information to control how soon negatively acknowledged messages should be resent on the slotted ring interconnect 14. If the occupancy rate is high, stations can wait longer before resending negatively acknowledged messages and thus reduce the rate at which messages are injected into the slotted ring interconnect 14. Thus, the fact that a message can be made to occupy a slot 12 on the slotted ring interconnect 14 for at most one cycle around the ring may also be beneficial for reducing congestion on a single slotted ringer interconnect 14.

A single slotted ring interconnect does not need the V and N bits used to avoid deadlock, as deadlock is not an issue for single ring. Having these bits, however, enables a better response to congestion. As an example, each station can monitor V bits flying past to monitor ring activity. For instance, if V bit is observed 80% of the time, a station may inject traffic at a slower than normal rate, or not inject at all until ring utilization drops. If all stations follow this mechanism, congestion is inherently self-regulated and ring traffic returns below a desirable threshold (whatever numeric value it may be as defined by the system). In the absence of a congestion control mechanism, agents inject traffic into the network whenever they can, resulting in further congesting an already congested network. Recovering from this congestion, when activity is high, takes a very long time. The effect of congestion is to non-linearly increase latency (or the time required for communication to occur). Thus, ensuring operation without congestion is generally better even if it means temporarily slowing or suspending messages into the ring by stations.

While the invention has been described in terms of several embodiments of the invention, those of ordinary skill in the art will recognize that the invention is not limited to the embodiments of the invention described, but can be practiced with modification and alteration within the spirit and scope of the appended claims. The description is thus to be regarded as illustrative instead of limiting.

What is claimed is:

1. A network comprising:
   at least one source station;
   at least one target station;
   at least one source slotted ring interconnect comprising a plurality of slots, the source station operably connected to the source slotted ring interconnect;
   at least one target slotted ring interconnect comprising a plurality of slots, the target station operably connected to the target slotted ring interconnect, wherein the target slotted ring interconnect and the source slotted ring interconnect are different; and
   at least one ring connector connecting the source slotted ring interconnect and the target slotted ring interconnect,
   wherein the source station is configured to transmit a message to one of the plurality of slots of the source slotted ring interconnect such that the message travels around the source slotted ring interconnect,
   wherein, if the ring connector or the target station is able to receive the message, the ring connector or the target station is configured to remove the message from the source slotted ring interconnect, otherwise the ring connector or the target station is configured to mark the message with a negative flag, and the source station is configured to remove the message marked with the negative flag from the source slotted ring interconnect, such that the message travels no more than one time around the source slotted ring interconnect before removal.

2. The network of claim 1, wherein the target is the ring connector or another ring connector associated with a target station operably connected to the target slotted ring interconnect.

3. The network of claim 1, wherein the source slotted ring interconnect is arranged to operate as a circular shift register.

4. The network of claim 1, wherein the message carries an identification of a target station or a ring connector.

5. The network of claim 1, wherein the source station, the target station, or both monitors the slot to which the source station, the target station, or both are attached for messages targeting the source station, the target station, or both.

6. The network of claim 1, wherein the target station removes the message from a slot if the target station has sufficient resource to receive the message.

7. The network of claim 1, wherein the ring connector is a bridge.

8. The network of claim 1, wherein the ring connector includes a buffer capable of holding the message.

9. The network of claim 1, wherein the source station keeps a copy of the message until the source station gets either a negative or a positive acknowledgement.

10. A method to avoid multi-ring deadlock comprising:
    putting a message from a source station in a slot of a source slotted ring interconnect directed to a target station on a target slotted ring interconnect, wherein the source slotted ring interconnect and the target slotted ring interconnect are not the same;
    allowing the message to travel around the source slotted ring interconnect; and
    if the target station is able to receive the message, removing the message from the source slotted ring interconnect either with a ring connector connecting the source slotted ring interconnect and the target slotted ring interconnect, or by the target station, and
    if the target station is not able to receive the message, marking the message with a negative flag and removing, by the source, the message marked with the negative flag from the source slotted ring interconnect, such that the message travels no more than one time around the source slotted ring interconnect before removal.

11. The method of claim 10, wherein the ring connector includes a buffer capable of holding the message.

12. The method of claim 10, further comprising keeping a copy of the message on the source station until the source station gets either a negative or a positive acknowledgement.

13. The method of claim 10, wherein the message comprises a valid bit V, a negative acknowledgement bit N, and one destination bit D[k] per station or ring connector k on the ring, wherein k represents a station on the slotted ring interconnect.

14. The method of claim 13, wherein the message includes a plurality of destination bits D, each of the plurality of destination bits D corresponding to a station operably attached to the source slotted ring interconnect.

15. The method of claim 13, wherein a precondition for the message to be sent is $V=0$ and $N=0$ for the slot, wherein the valid bit $V=0$ represents that the slot is not occupied by a valid message, and the valid bit $V=1$ represents that the slot is occupied by a valid message.

16. The method of claim 15, further comprising setting $V:=1$, $D[s]:=1$, and $D[t]:=1$ when a message is sent, where $D[s]$ is a destination bit of the source station and $D[t]$ is the destination bit of the target station.

17. The method of claim 13, wherein the target receives a message if V=1 and N=0 and D[t]=1, where D[t] is the destination bit of the target station.

18. The method of claim 17, further comprising setting V:=0, D[s]:=0, and D[t]:=0 when a message is received.

19. The method of claim 13, further comprising setting a negative acknowledgement by setting V:=0 and N:=1 and D[s]:=1 if the target cannot receive the message.

20. The method of claim 13, further comprising the source station counting time and performing checks in the clock when either positive or negative acknowledgement is scheduled to arrive.

21. The method of claim 20, further comprising removing the message from the ring by setting N:=0 and D[s]:=0 if the message arrives with V=0 and N=1 and D[s]=1.

22. The method of claim 21, wherein the source station recognizes that D[s]=1 indicates a negative acknowledgement and that the message needs to be re-sent at a later time.

23. The method of claim 21, further comprising allowing the source station to send a different message if the source station has another message to send.

24. The method of claim 20, further comprising discarding the message if the message arrives with D[s]=0.

25. The method of claim 24, wherein the source station recognizes that D[s]=0 indicates a positive acknowledgement and that the original message has been successfully delivered.

26. The method of claim 20, wherein if D[s]=1 and V=1 and N=0 and the source station can receive a new message, setting V:=0, D[s]:=0, and D[u]:=0 when the new message is received, wherein D[u] is the destination bit of a target station u.

27. The method of claim 20, wherein if D[s]=1 and V=1 and N=0 and the source station cannot receive a new message, setting a negative acknowledgement by setting V:=0 and N:=1 and D[s]:=0.

28. A method comprising:
    controlling congestion on a network with a single slotted ring interconnect comprising limiting the slot occupancy of a message from a source station to a target station to at most one cycle around the slotted ring interconnect by marking the message with a negative flag, if the target station is not able to receive the message, and removing, by the source station, the message marked with the negative flag; and
    determining a wait time by the source station to be used by the source station for resending the message based on an occupancy rate of one or more slots of the slotted ring interconnect.

29. The method of claim 28, further comprising monitoring the occupancy rate of the one or more slots by the source station in the network comprising the slotted ring interconnect as the slots rotate past the source station and use that information to control how soon the message that had been previously not received by the target station should be resent by the source station.

30. The method of claim 29, comprising increasing a wait time before resending the message.

31. The method of claim 30, wherein increasing the wait time reduces the congestion on the slotted ring interconnect.

* * * * *